US005503420A

United States Patent [19]

Consiglio et al.

[11] Patent Number: 5,503,420
[45] Date of Patent: Apr. 2, 1996

[54] PARKING ACCESSORY FOR MOTORCYCLES

[76] Inventors: Ronald Consiglio, 1259 Marina Pt. Apt. 301, Casselberry, Fla. 32707; Salvatore Consiglio, 115 Crossfield Rd., Branford, Conn. 06471

[21] Appl. No.: 18,379

[22] Filed: Feb. 16, 1993

[51] Int. Cl.[6] .................................................. B60R 13/10
[52] U.S. Cl. ...................... 280/288.4; 280/293; 40/209
[58] Field of Search ............................... 280/288.4, 293, 280/301, 304.5; 40/209, 200, 206, 156, 157, 910

[56] References Cited

U.S. PATENT DOCUMENTS

| | | | |
|---|---|---|---|
| 1,829,824 | 11/1931 | Forrester | 40/209 |
| 1,887,727 | 11/1932 | Adams | 40/209 |
| 2,154,959 | 4/1939 | Roose | 40/156 |
| 2,792,654 | 5/1957 | Larson | 40/209 |
| 3,263,358 | 8/1966 | Dosie et al. | 40/209 |
| 3,996,682 | 12/1976 | Schwartz | 40/156 |
| 4,170,838 | 10/1979 | Bott | 40/209 |
| 4,182,062 | 1/1980 | Krokos et al. | 40/209 |
| 4,474,387 | 10/1984 | Maranell et al. | 280/293 |
| 4,521,031 | 6/1985 | Huth | 280/293 |
| 4,625,987 | 12/1986 | Marsh | 280/293 |
| 4,736,539 | 4/1988 | Dickinson | 40/209 |
| 5,012,602 | 5/1991 | Storey | 40/209 |

FOREIGN PATENT DOCUMENTS

| | | | |
|---|---|---|---|
| 0591440 | 4/1959 | Italy | 40/200 |
| 0021456 | of 1900 | United Kingdom | 40/156 |

Primary Examiner—Anne Marie Boehler
Attorney, Agent, or Firm—H. Gibner Lehmann; K. Gibner Lehmann

[57] ABSTRACT

A parking accessory for motorcycles has a frame which provides a first compartment for a license plate, and a second compartment behind the first compartment to carry a plate-like kickstand pad which can be removed and placed under the end of the kickstand when it is desired to park the motorcycle. The kickstand pad prevents penetration of the surface on which the motorcycle is resting and consequent loss of upright support of the cycle.

14 Claims, 3 Drawing Sheets

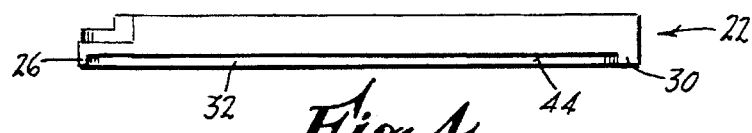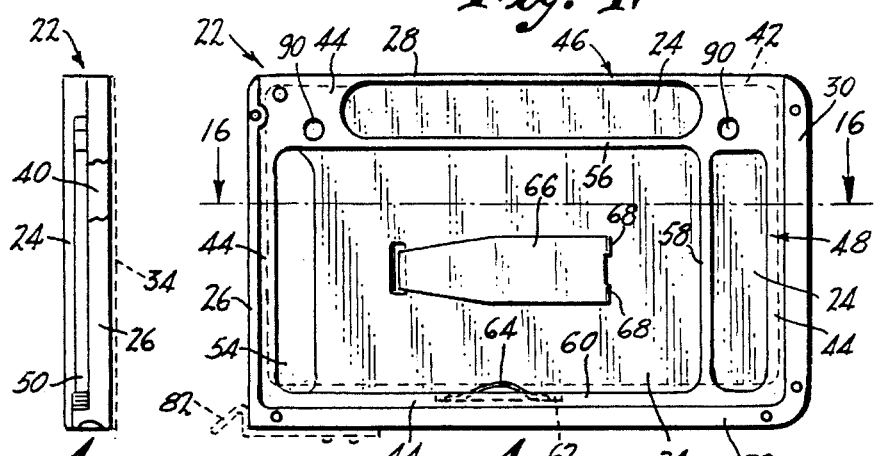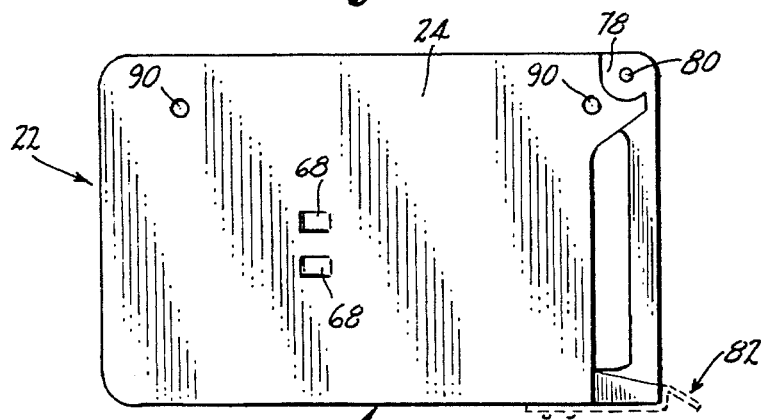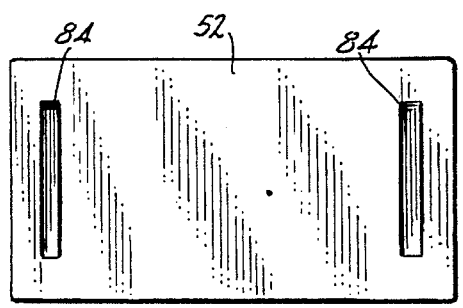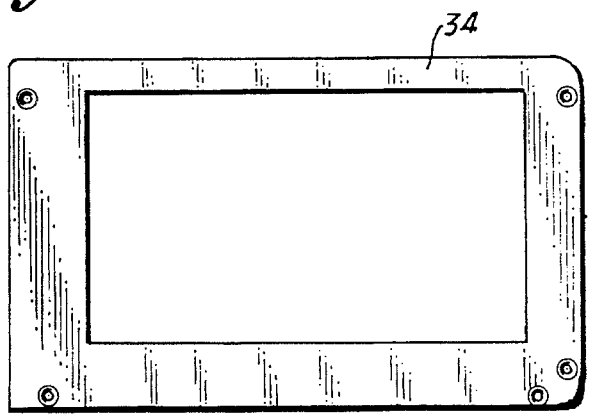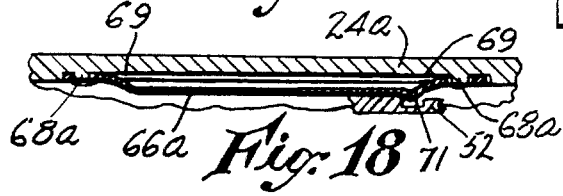

PARKING ACCESSORY FOR MOTORCYCLES

NO CROSS REFERENCES TO RELATED APPLICATIONS

STATEMENT AS TO RIGHTS TO INVENTIONS MADE UNDER FEDERALLY-SPONSORED RESEARCH AND DEVELOPMENT

Research and development of the present invention and application have not been Federally-sponsored, and no rights are given under any Federal program.

BACKGROUND OF THE INVENTION

1. Field of the Invention

This invention relates generally to motorcycle accessories, and more particularly to an accessory for holding kickstand pads which are used for preventing penetration of the end of a kickstand into soft ground and the resultant tipping of the cycle.

2. Description of the Related Art Including Information Disclosed Under 37 CFR §§1.97–1.99

Motorcycling today has grown substantially in popularity, both as a means of transportation, and also as a recreation outlet for many people. With increased sophistication in design, many such vehicles represent a considerable investment to their owners/operators, with both popular and customized models typically costing many thousands of dollars.

Along with the increased value noted, there has arisen the need to be able to park these vehicles safely, with essentially complete freedom from tipping in order to avoid potentially critical damage to both the vehicles and any passengers.

U.S. Pat. No. 4,474,387 sets forth, in col. 1, first three paragraphs, a major problem faced by the typical owner. The solution proposed in the patent is to provide a kickstand support or pad which can be placed under the kickstand, to distribute the weight of the cycle when it is parked, especially in areas where the ground is either soft, or constituted of asphalt paving, a material also considered to be relatively soft. During operation of the cycle, the pad is stored on a frame member of the vehicle by means of an elastic strap, FIGS. 3 and 5.

Another approach is shown in U.S. Pat. No. 4,521,031 wherein there is disclosed a kickstand pad having a hole by which it can be secured to a cord or leather loop 24 existing on the cycle frame, FIG. 2, or to a cable 26 thereon, FIG. 3.

U.S. Pat. No. 4,625,987 illustrates and describes still another support plate for a kickstand, with a chain fastener between the plate and the motorcycle frame. In connection with storing the device, col. 3 of the patent mentions that the chain can alternately be wrapped up upon itself, put into a motorcycle saddle bag, or stored on the person of the operator.

Several disadvantages become apparent with the solutions proposed in the foregoing patents. First, there existed a distinct possibility of such kickstand pads becoming either misplaced or stolen, since they were often stored in plain sight, and visible to anyone who happened to pass by. No provision was made for concealing them, or locking them in place, and thus the owner might very well find the pad missing after leaving the vehicle unattended for a period of time.

Also, there is presently a significant focus on style and image of the modern cycle. Accessories which were either merely tied in place or otherwise secured in a more or less haphazard fashion were considered in poor taste aesthetically, and thus generally have not found any significant acceptance by the motorcycling community.

SUMMARY OF THE INVENTION

Up to the present time, a good and viable solution to the problems noted above has not become apparent, and accordingly it is an object of the present invention to provide a novel and improved motorcycle accessory which, in a simple and effective manner, provides a reliable and secure storage for a motorcycle kickstand plate, the accessory being both simple in its structure and rugged in use.

A related object of the invention is to provide an accessory as above set forth, which completely conceals the kickstand pad during storage, thereby virtually eliminating potential theft and greatly minimizing the possibility of inadvertent loss.

A further object of the invention is to provide an accessory as outlined above, wherein the kickstand pad is readily accessible, thereby rendering the accessory especially convenient to use.

Still another object of the invention is to provide an accessory in accordance with the foregoing, wherein the kickstand pad can be readily removed from storage and placed in its operative position with only minimal effort and completely by hand, and wherein return to its storage position is similarly easily accomplished.

Yet another object of the invention is to provide an accessory as above characterized, wherein there are completely eliminated rattling noises resulting from vibration of the kickstand pad while in storage, this being accomplished without the need for special structures and/or sound-muffling barriers and the like.

A further object of the invention is to provide an accessory of the kind indicated, wherein assembly to the motorcycle can be accomplished with merely a screwdriver, and with little special knowledge or skills on the part of the user, thereby increasing the attractiveness and marketability of the accessory.

Another object of the invention is to provide an improved accessory as noted above, wherein the physical appearance is aesthetically pleasing and eye-catching, and which thus adds an overall pleasing or attractive and eye-catching appeal to the motorcycle.

Still another object of the invention is to provide an improved accessory in accordance with the above, wherein the manufacturing cost is minimal, and where the individual parts can be made and assembled with a minimum of time and effort, thereby rendering the unit economical to produce.

Yet another object of the invention is to provide an improved accessory as described above, which is universal, namely adapted for use with virtually any size/configuration of license plate currently in existence.

The above objects are accomplished by a parking accessory adapted to be attached to and carried by a motorcycle, the accessory being constituted as a combined holder for a vehicle license plate and also a kickstand pad, and comprising in combination frame means providing a compartment for receiving and holding a license plate, and providing a second compartment which is broadside to the first-mentioned compartment and which is adapted to receive and store a kickstand pad, and means carried by the frame means, for attaching the frame means to the chassis of a motorcycle.

The objects are further accomplished by a parking accessory adapted to be attached to and carried by a motorcycle, the accessory being constituted as a combined holder for a vehicle license plate and also a kickstand pad, comprising in combination a panel-like kickstand pad, frame means providing a compartment for receiving and holding a license plate, and providing a second compartment which is broadside to and which connects with the first-mentioned compartment and in which the kickstand pad is disposed and held, and spring means carried by the frame means, for urging together the kickstand pad and a license plate that is received in the first-mentioned compartment, thereby to prevent relative looseness and rattling of the pad and/or license plate.

The arrangement is such that the following objectives can be achieved: 1) the kickstand pad, when stored, is completely concealed by and confined by the license plate and body part of the accessory's frame; 2) the kickstand pad can be readily accessed via a side door, for removal, and replaced as desired, without tools or special equipment; 3) the pad, when stored, is held against vibration, thereby eliminating possible noise from rattling or shifting thereof in its compartment.

Other features and advantages will hereinafter appear.

BRIEF DESCRIPTION OF THE DRAWINGS

FIG. 3 is a rear elevational view of a dished die-cast body part of the frame means comprising the improved accessory.

FIG. 4 is a top plan view of the body part of FIG. 3.

FIG. 5 is a right end elevation of the body part of FIG. 3.

FIG. 6 is a left end elevation of the body part of FIG. 3.

FIG. 7 is a front elevational view of the body part of FIG. 3.

FIG. 8 is a plan view of the kickstand pad which is insertable in and removable from the frame means provided by the invention.

FIG. 9 is a rear elevational view of a cover part of the frame means provided by the invention.

FIG. 18 is a fragmentary horizontal sectional view through a central portion of the front wall of the accessory, somewhat like the view of FIG. 16 but showing another embodiment of spring means.

Figure 1:
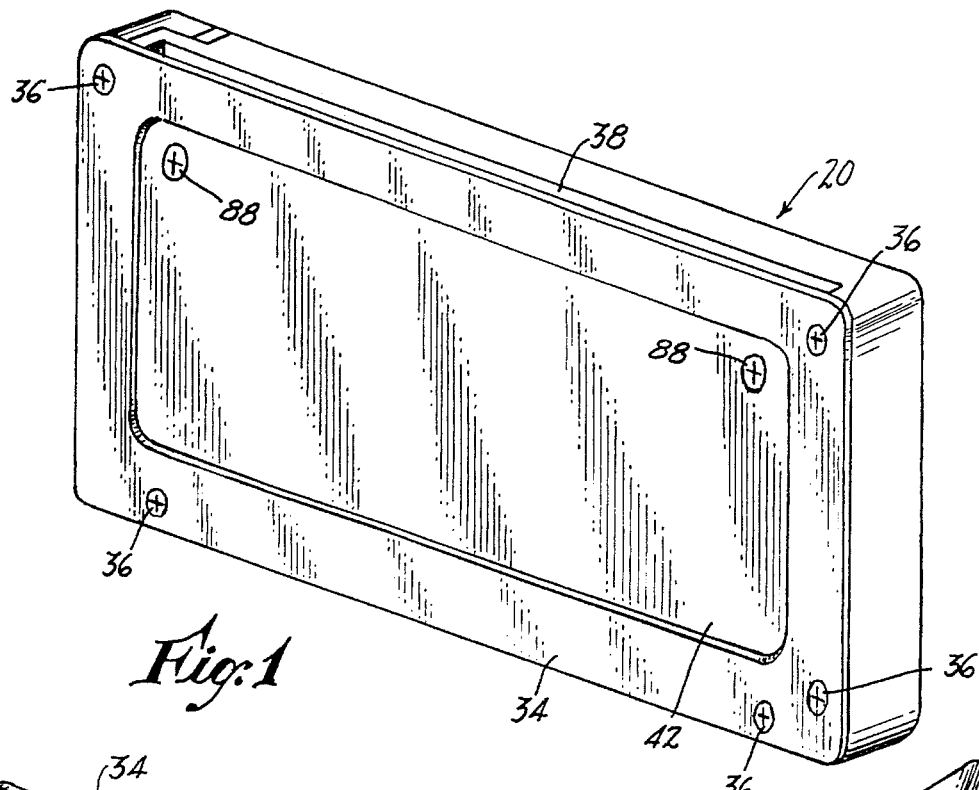
FIG. 1 is a rear perspective view of an improved motorcycle parking accessory in the form of a license plate and kickstand pad holder as provided by the invention.
Figure 2:
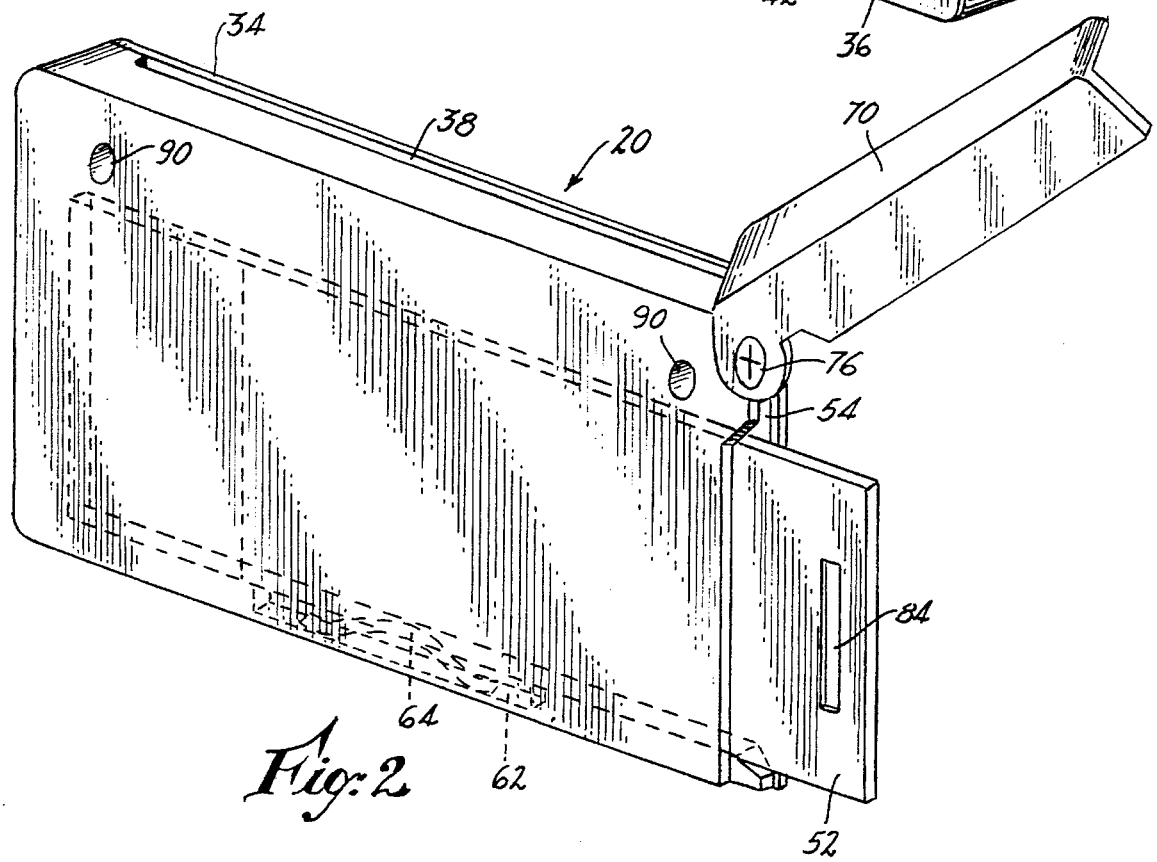
FIG. 2 is a front perspective view of the accessory of FIG. 1, with a side closure member lifted and with the kickstand pad partially removed from the holder.
Figure 11:
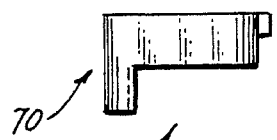
FIG. 11 is a top plan view of the closure member of FIG. 10.
Figure 12:
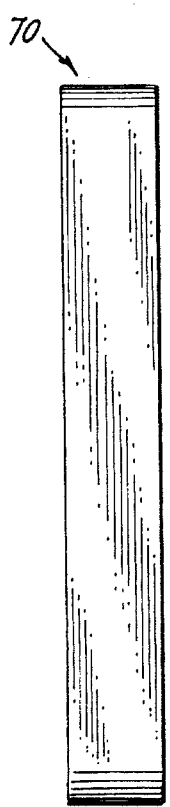
FIG. 12 is an outside elevational view of the closure member of FIG. 10.
Figure 10:
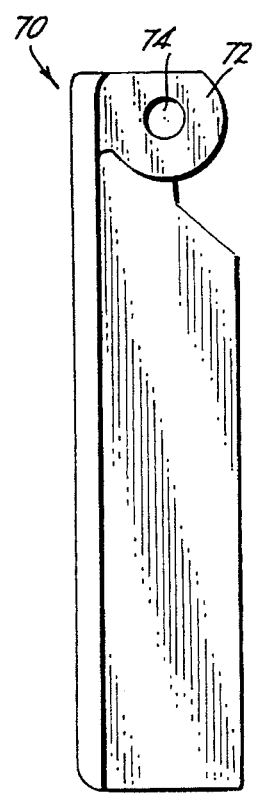
FIG. 10 is a rear elevational view of a pivoted closure member for the body part of FIG. 3, as provided by the invention.
Figure 13:
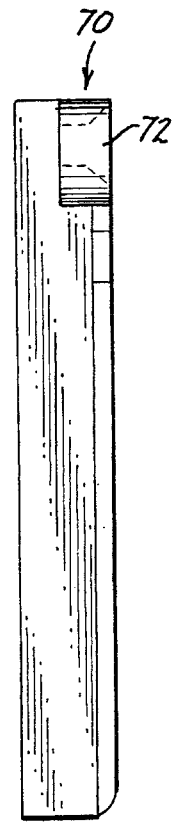
FIG. 13 is an inside elevational view of the closure member of FIG. 10.
Figure 14:
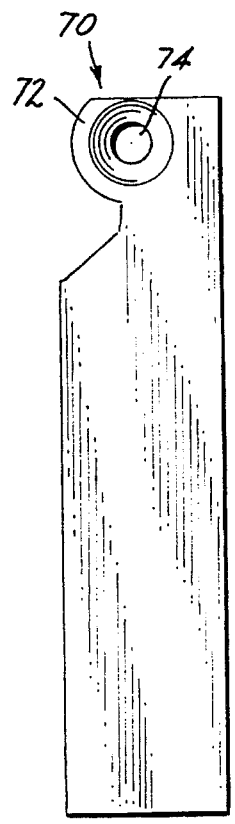
FIG. 14 is an inside elevational view of the closure member of FIG. 10, looking in a direction 90° with respect to the view of FIG. 13.

Referring first to FIGS. 1–3, the improved parking accessory as provided by the invention is indicated generally by the numeral 20, such accessory comprising a flat, dished rectangular body part 22 which is preferably constituted as an aluminum die casting. The body part 22 can be otherwise formed, as for example of a sheet metal stamping or a plastic molding. The body part 22 has a front wall 24 which is bounded by edge portions 26, 28, 30 and 32. The edge portions 26, 30 and 32 have surfaces which lie in a common plane and which are contacted by a cover part 34 (FIGS. 1, 2, 9 and 16) held in place by screws 36.

By this invention, the edge portion 28 has a face which is recessed or set forward of the faces of the portions 26, 30 and 32, as can be seen in FIG. 4, thereby in accordance with the invention providing a top access opening 38 for a first compartment 40 which is adapted to receive a license plate 42, FIGS. 1 and 3. This recessed face of the edge portion 28 is designated 44, and such face also extends along the inside of the edge portions 26, 30 and 32. The faces 44 at the edge portions 26 and 30 provide a backing against which the license plate 42 (shown dotted in FIG. 3) rests. Cored-out spaces 46 and 48 lighten the weight of the body part 22 and result in a saving of material as well.

In accordance with the present invention a second compartment 50 (FIG. 16) is provided by the frame means 20 and body part 22, such second compartment accommodating a kickstand pad 52 illustrated in FIGS. 2 and 8 and which is inserted into the compartment 50 from the side of the frame means, through an access opening 54. The second compartment 50 is defined on three sides by partitions or walls 56, 58 and 60, FIG. 3, such walls permitting the pad 52 to be easily slid into the compartment 50.

In accordance with the invention, unique spring means are provided to prevent looseness or rattling of the license plate 42 and pad 52 due to vibrations during use of the accessory (i.e., during storage of the pad). As seen in FIG. 3, the lower edge portion 32 of the body part 22 has a recess 62 to accommodate a bowed leaf spring 64 which is adapted to engage the lower edge of the pad 52. Also, a bowed leaf spring 66 is mounted by fingers 68 (FIG. 16) on the front wall 24 of the body part, for broadside engagement with the pad 52. The spring 66 biases the pad 52 into firm engagement with the license plate 42, thereby forcing these firmly together and preventing any vibrations from causing rattling. The small size of the laid-over fingers 68 at the front face of the wall 24 minimizes the likelihood of marring the external appearance of the wall.

Figure 15:
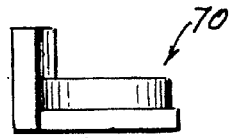
FIG. 15 is a bottom plan view of the closure member of FIG. 10.

The side access opening 54 is partially closed by a pivoted closure member 70, FIGS. 2, and 10–15. The closure member 70 has an angular cross section as seen in FIG. 15, and at its top it has a cylindrical bearing portion 72 with a pivot hole 74 to accommodate a pivot screw 76, FIG. 2. As seen in FIG. 7, the body part 22 has a bearing cut-out 78 to accommodate the cylindrical portion 72 of the closure member, and has a threaded hole 80 for the screw 76. A clasp means in the form of a latching spring 82 is carried by the lower edge portion 32 of the body part, to hold the closure member in closed position.

The kickstand pad 52 is shown as having finger depressions 84 to provide a convenient grip at the time that the pad is to be removed from the frame means.

Figure 17:
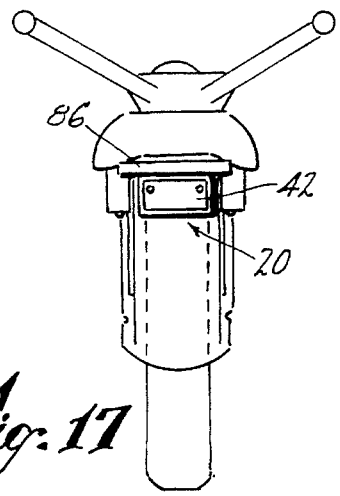
FIG. 17 is a rear view of a motorcycle having applied to it the improved parking accessory as provided by the invention.

FIG. 17 illustrates the frame means 20 mounted under a carrier stand 86 at the rear of a motorcycle. At the time that a license plate is enclosed in the frame, the mounting bolts 88 for the license are passed through the holes provided therein, and through holes 90 in the front wall of the frame, and then through the license plate mounting on the motorcycle (not shown), under the carrier 86. The side access opening 54 of the frame 20 is not covered by the carrier 86, even though the top access opening 38 may be. Thus, accessibility is always had for removal of the parking pad 52 for its use. This feature of top and side access openings in the cast body 22 is unique, enabling easy fabrication in dies, and constitutes an important part of the invention.

Another embodiment of the invention comprising spring means to prevent looseness and rattling of the license plate 42 and the kickstand pad 52 as provided by the invention is illustrated in FIG. 18. In this figure, the front wall 24a of the accessory has in its rear surface a centrally-disposed horizontal shallow groove 69 at the ends of which integral bosses or hubs 68a are provided. A bowed elongate leaf spring 66a has apertured end portions which are disposed in the ends of the groove 69, through which end portions the bosses 68a extend. The bosses 68a are mushroomed or staked over the spring ends to retain these in the groove 69. At one end of the spring 66a the aperture thereof is in the form of a slot, and the boss 68a at that end portion provides a loose fit to enable limited movement of the spring end to occur when the spring is flattened by its contact with the kickstand pad 52.

Figure 16:
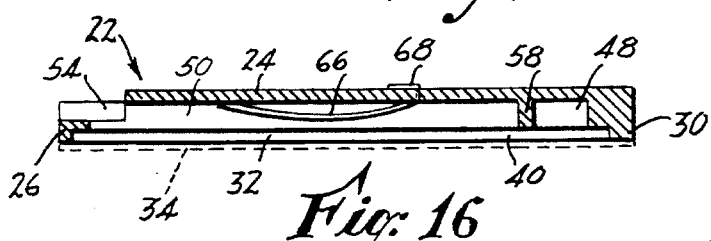
FIG. 16 is a sectional view of the body member of FIG. 3, taken on the line 16—16 of this figure.

The spring 66a can be longer than the spring 66 shown in FIGS. 3 and 16, and it can have somewhat less width than the spring 66. Alternatively, the groove 69 and the spring 66a can be much shorter than shown, whereby the anchorage of the left end of the spring as viewed in FIG. 18 can be eliminated. Additionally, the spring 66a can have a protuberant detent portion 71 to be received in one of the finger-grip slots 84 of the pad 52, thereby to strongly retain the pad in its compartment and eliminate the need for providing the accessory with the closure member 70. The right end of the groove 69 and spring 66a, as viewed in FIG. 18, can be closely adjacent to the partition wall 58 shown in FIG. 3, thereby to minimize weakening of the wall 24a.

Variations and modifications are possible without departing from the spirit of the invention.

Each and every one of the appended claims defines an aspect of the invention which is separate and distinct from all others, and accordingly it is intended that each claim be treated in this manner when examined in the light of the prior art devices in any determination of novelty or validity.

What is claimed is:

1. A parking accessory adapted to be attached to and carried by a motorcycle, said accessory being constituted as a combined holder for a vehicle license plate and also a kickstand pad and comprising in combination:

a) frame means providing a compartment for receiving and holding a license plate, and providing a second compartment which is broadside to said first-mentioned compartment and which is adapted to receive and store a kickstand pad, b) means carried by said frame means, for attaching the frame means to the chassis of a motorcycle, and c) spring means carried by said frame means and jutting into said second compartment, d) said spring means being adapted for engagement with a kickstand pad which is insertable into the second compartment, to prevent looseness and rattling of the pad, e) said frame means having a front wall defining one wall of the second compartment, f) said spring means being carried by said front wall, g) said means for attaching the frame means to the chassis of a motorcycle comprising bolts passing through said front wall.

2. A parking accessory adapted to be attached to and carried by a motorcycle, said accessory being constituted as a combined holder for a vehicle license plate and also a kickstand pad and comprising in combination:

a) frame means providing a compartment for receiving and holding a license plate, and providing a second compartment which is broadside to said first-mentioned compartment and which is adapted to receive and store a kickstand pad, b) means carried by said frame means, for attaching the frame means to the chassis of a motorcycle, and c) spring means carried by said frame means and jutting into said second compartment, d) said spring means being adapted for engagement with a kickstand pad which is insertable into the second compartment, to prevent looseness and rattling of the pad, e) said frame means having a front wall defining one wall of the second compartment, f) said spring means being carried by said front wall, g) said means for attaching the frame means to the chassis of a motorcycle comprising bolts passing through said front wall and adapted to pass through mounting holes of a license plate.

3. A parking accessory as set forth in claim 2, wherein:

a) said frame means has an access opening at its top, connecting with said first-mentioned compartment, and has an access opening at one side, connecting with said second compartment.

4. A parking accessory as set forth in claim 3, wherein:

a) said frame means has side vertical edge portions, b) said side access opening being disposed wholly to the rear of one of said side vertical edge portions.

5. A parking accessory as set forth in claim 2, wherein:

a) said spring means comprises a leaf spring having mounting fingers passing through said front wall.

6. A parking accessory as set forth in claim 2, wherein:

a) said spring means comprises a leaf spring adapted to engage edge portions of the pad carried in said second compartment.

7. A parking accessory as set forth in claim 2, wherein:

a) said frame means comprises a die cast, flat body part and a flat, sheet cover part overlying edge portions of said body part.

8. A parking accessory as set forth in claim 2, wherein:

a) said kickstand pad has a finger depression in one side, to provide a finger grip.

9. A parking accessory as set forth in claim 2, wherein:

a) said frame means substantially completely conceals said kickstand pad when the latter is inserted into said second compartment.

10. A parking accessory as set forth in claim 2, wherein:

a) said frame means substantially completely confines said kickstand pad when the latter is inserted into said second compartment.

11. A parking accessory as set forth in claim 2, wherein:

a) said kickstand pad comprises a substantially rectangular piece of metal, which when inserted into said second compartment, is substantially coextensive with the license plate of the motorcycle.

12. A parking accessory adapted to be attached to and carried by a motorcycle, said accessory being constituted as a combined holder for a vehicle license plate and also a kickstand pad and comprising in combination:
 a) frame means providing a compartment for receiving and holding a license plate, and providing a second compartment which is broadside to said first-mentioned compartment and which is adapted to receive and store a kickstand pad,
 b) means carried by said frame means, for attaching the frame means to the chassis of a motorcycle, and
 c) spring means carried by said frame means and jutting into said second compartment,
 d) said spring means being adapted for engagement with a kickstand pad which is insertable into the second compartment, to prevent looseness and rattling of the pad,
 e) said frame means having a front wall defining one wall of the second compartment,
 f) said spring means being carried by said front wall,
 g) said front wall having a horizontal groove in its rear face, and having an integral boss disposed at one end of said groove,
 h) said spring means comprising an elongate leaf spring having an apertured end portion through which the said boss extends, and over which the boss is headed.

13. A parking accessory as set forth in claim 12, wherein:
 a) means are provided for connecting the other end portion of the leaf spring to said front wall.

14. A parking accessory as set forth in claim 12, wherein:
 a) said leaf spring has a protuberant detent portion adapted to be received in a depression of a kickstand pad to yieldably hold the pad in said second compartment.

* * * * *